(12) United States Patent
De Kok

(10) Patent No.: US 8,100,001 B2
(45) Date of Patent: Jan. 24, 2012

(54) MEASURING CONSTRUCTION AND METHOD FOR MEASURING TYRE DATA

(75) Inventor: Dirk Okker De Kok, Mierlo (NL)

(73) Assignee: Nederlandse Organisatie voor toegepast-natuurwetenschappelijk onderzoek TNO, Delft (NE)

( * ) Notice: Subject to any disclaimer, the term of this patent is extended or adjusted under 35 U.S.C. 154(b) by 15 days.

(21) Appl. No.: 12/516,832

(22) PCT Filed: Dec. 3, 2007

(86) PCT No.: PCT/NL2007/050613
§ 371 (c)(1),
(2), (4) Date: Nov. 25, 2009

(87) PCT Pub. No.: WO2008/066385
PCT Pub. Date: Jun. 5, 2008

(65) Prior Publication Data
US 2010/0064790 A1  Mar. 18, 2010

(30) Foreign Application Priority Data
Dec. 1, 2006 (EP) .................................. 06077144

(51) Int. Cl.
*G01M 17/02* (2006.01)
(52) U.S. Cl. ............................. 73/146; 451/1
(58) Field of Classification Search .......... None
See application file for complete search history.

(56) References Cited

U.S. PATENT DOCUMENTS

| | | | |
|---|---|---|---|
| 5,022,186 A * | 6/1991 | Rogers, Jr. ................. | 451/1 |
| 5,099,613 A * | 3/1992 | Rogers, Jr. ................. | 451/24 |
| 6,016,695 A * | 1/2000 | Reynolds et al. ........... | 73/146 |
| 6,116,084 A | 9/2000 | Fischer et al. | |
| 7,055,917 B2 | 6/2006 | Huchard et al. | |
| 7,340,947 B2 * | 3/2008 | Shinomoto et al. ........ | 73/146 |
| 2002/0011103 A1* | 1/2002 | Kimbara et al. ........... | 73/146 |
| 2005/0212356 A1 | 9/2005 | Huchard et al. | |
| 2010/0031740 A1* | 2/2010 | Olex et al. ................ | 73/146 |
| 2011/0011170 A1* | 1/2011 | Stalnaker et al. ......... | 73/146 |

FOREIGN PATENT DOCUMENTS

| | | |
|---|---|---|
| EP | 0426457 A2 | 5/1991 |
| EP | 0775905 A1 | 5/1997 |
| GB | 1602700 | 5/1978 |
| WO | WO2004027371 A2 | 4/2004 |

\* cited by examiner

*Primary Examiner* — Andre Allen
(74) *Attorney, Agent, or Firm* — Hoffmann & Baron, LLP

(57) ABSTRACT

Measuring construction for measuring use conditions of a tire, configured to be mounted to a support arrangement and provided with a tilting arrangement for tilting and/or adjusting a force on a tire, wherein the tilting arrangement is provided with a measuring instrument that is connected to the tilting arrangement, at least configured and measure forces and/or moments on a tire, a wheel axle supported by the measuring instrument, and at least one actuator for driving the tilting arrangement, wherein the tilting arrangement comprises a foldable construction connected to the at least one actuator.

23 Claims, 7 Drawing Sheets

MEASURING CONSTRUCTION AND METHOD FOR MEASURING TYRE DATA

This application is the U.S. National Phase of, and Applicant claims priority from, International Application Number PCT/NL2007/050613 filed 3 Dec. 2007 and European Patent Application No. 06077144.1 filed 1 Dec. 2006, each of which are incorporated herein by reference.

BACKGROUND OF THE INVENTION

The invention relates to a measuring construction for measuring forces and/or moments on a tyre, configured to be mounted to a support arrangement.

The invention also relates to a method for measuring tyre data.

Measuring constructions for measuring tyre load data are known in the art. This tyre data for example includes forces and/or moments acting on a tyre. This data is used to optimise the dimensions and composition of the tyre. Known measuring constructions are designed for measuring load data in car tyres, and are generally not suitable for motor cycle tyres since car tyres are differently constructed than motor cycle tyres and have different load characteristics during use. Furthermore car tyres have a different working area than motor tyres, for example a different side slip angle range and camber angle range. Also, car tyres generally have a relatively flat outer contact surface, e.g. are cylindrically shaped, whereas motor cycle tyres have a relatively round contact surface, e.g. have a more or less donut shaped outer surface.

A known construction for measuring tyre load data comprises an axis that is connected to a support arrangement at two ends. This axis supports a wheel axle, perpendicular to said axis, which wheel axle supports a wheel with a tyre. The angular rotation of the axis can be set to incline the tyre with respect to the ground surface. The support arrangement can vertically move the measuring construction for putting the inclined tyre in contact with the ground surface. Once the tyre is set to the ground, it can be tested such that load data can be derived.

At inclined positions of the tyre, the support arrangement has to lower or lift the measuring construction over a relatively large vertical height difference to compensate for the inclinations. Because of this the inclinations of the tyre cannot be set accurately, such that the known construction is unsuitable for motor cycle tyres.

Therefore, it is one of the goals of the invention to provide means that are suitable for testing motor cycle tyres and/or tyre testing means that need less vertical space.

SUMMARY OF THE INVENTION

In a first aspect, this goal and/or other goals of the invention can be achieved individually or in combination, by a measuring construction for measuring use conditions of a tyre, configured to be mounted to a support arrangement and provided with a tilting arrangement for tilting and/or adjusting a force on a tyre, wherein the tilting arrangement is provided with a measuring instrument that is connected to the tilting arrangement, at least configured to measure forces and/or moments on a tyre, a wheel axle supported by the measuring instrument, and at least one actuator for driving the tilting arrangement, wherein the tilting arrangement comprises a foldable construction for tilting and/or translating a tyre, connected to the at least one actuator.

By having a foldable construction, the tilting arrangement can stay in a fixed position, while it is possible to rotate and translate a tyre. More particularly, the tyre may be inclined with respect to a surface, while the vertical position of the tyre with respect to a surface may be controlled. A foldable construction may be arranged such that, the tyre can be inclined while it stays in contact with the ground. In this way, a particular force vector that acts on the tyre can be readily controlled, for example it may be kept constant, while the tyre is inclined. Since motor cycle tyres in principle keep a relatively constant vertical force vector while being inclined, the invention may be especially suitable for motor cycle tyre testing.

In an embodiment, the foldable construction comprises a parallelogram. For example, one of the legs of the parallelogram may support a measuring instrument that supports a wheel axle with wheel. By displacement of one of the legs while holding the opposite leg, the force applied to the tyre can be adjusted, for example by pressing the tyre downwards, while the inclination of the tyre with respect to the ground surface is kept relatively constant. Vice versa, the tyre can be inclined while its height and/or load is/are kept constant. Both translation and rotation are controlled while the tyre is tested on a surface.

With a parallelogram, the tyre can be inclined over relatively large angles. Among others, using a parallelogram allows for better control for setting constant and/or different loads and/or controlling specific inclinations of said tyre. In general, the parallelogram facilitates separate control and testing of loads and inclinations in a convenient and fluent way.

In a further embodiment, the measuring instrument may support a brake system, for example via the wheel axle. The forces on the tyre pass through the measuring system. When the brake system is supported by the measuring system, a brake torque can be applied without disturbing the forces and/or moments in the tyre and the tyre can be braked in inclined condition.

In an embodiment, the support arrangement comprises a vehicle such as a truck or trailer. Because of the relatively small vertical displacement of the measuring construction, it can be conveniently connected to the bottom of a vehicle. This allows the tyre to be measured on outdoor surfaces, such as for example asphalt, providing for relatively realistic simulation conditions for the tyre.

In a second aspect, said goal and/or other goals of the invention can be achieved individually or in combination, wherein the invention comprises a method for automatically measuring tyre load data, wherein the tyre is rotated around a wheel axle and moved along a surface, wherein reaction forces and/or moments that occur on said tyre are measured and converted to tyre load data, wherein a first variable is an applied force vector and a second variable is an inclination of the tyre as compared to the surface, wherein said first or second variable is varied while the other variable is kept relatively constant.

BRIEF DESCRIPTION OF THE DRAWINGS

In clarification of the invention, embodiments thereof will be further elucidated with reference to the drawing. In the drawing.

DETAILED DESCRIPTION OF THE INVENTION

Figure 1:
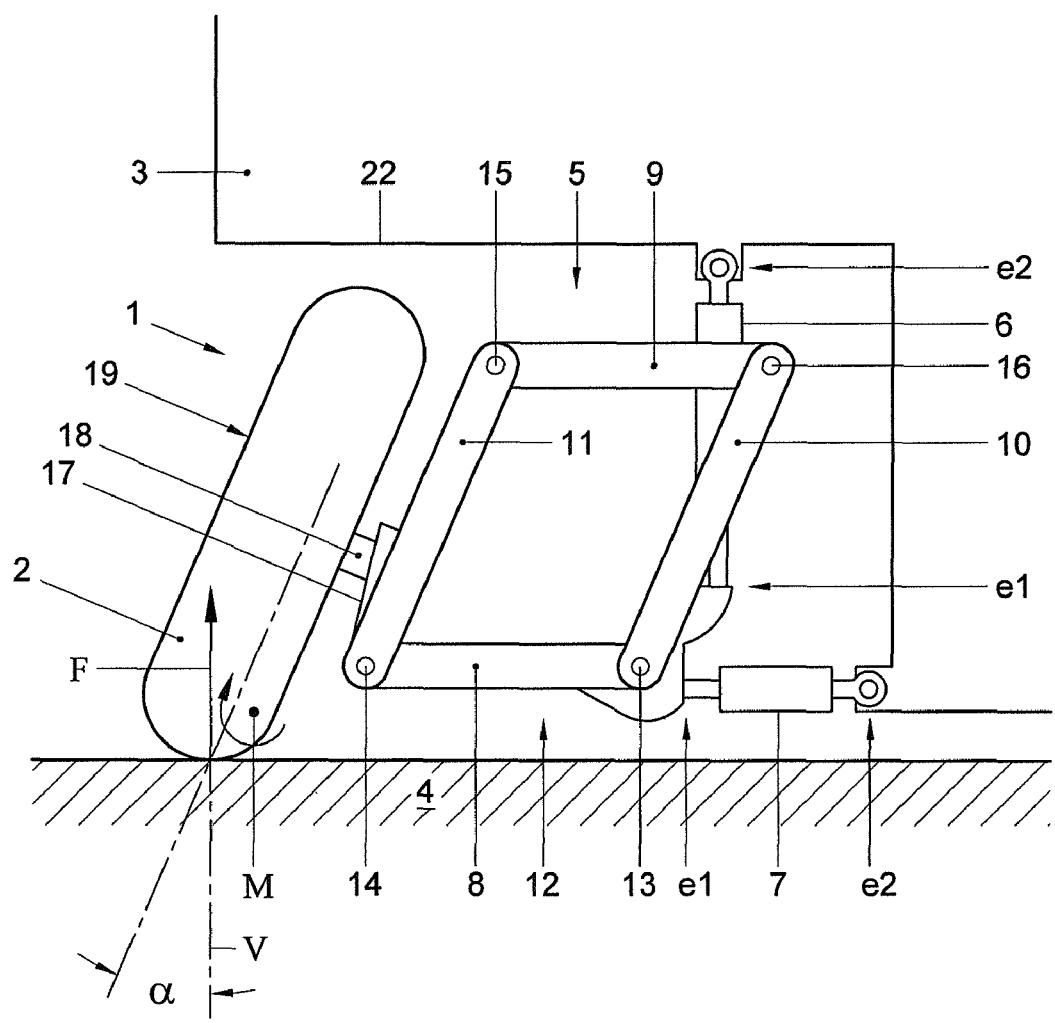
FIG. 1 shows a schematic side view of a measuring construction with tyre.

In this description, identical or corresponding parts have identical or corresponding reference numerals. The exemplary embodiments shown should not be construed to be limitative in any manner and serve merely as illustration.

In FIG. 1, an embodiment of a measuring construction 1 is shown for measuring forces and moments on a tyre 2 for a motorcycle. The measuring construction 1 may be connected to a vehicle 3 that drives along a surface 4. In an embodiment, the vehicle 3 may be a truck or trailer, for example. The measuring construction 1 comprises a tilting arrangement 5 for tilting the tyre 2 with respect to the surface 4 and setting a load on the tyre 2. The vehicle 3 may also comprise a lift construction 23 for lifting and lowering the measuring construction 1. The tilting arrangement 5 is equipped with a tilt actuator 6, a load actuator 7 and a parallelogram 12. In an embodiment, the actuators 6, 7 comprise hydraulic cylinders. The parallelogram comprises legs 8, 9, 10, 11. As can be seen from FIG. 6, 7 or 8, each leg 8, 9, 10, 11 may comprise two parallel legs 28A, 28B connected by spacers 29. The actuators 6, 7 are pivotally connected to the vehicle 3 at one end e2. At the other end e1, the actuators 6, 7 are connected to one of the legs 8, 9, 10, 11 of the parallelogram 12, among others to prevent the tilting arrangement 5 from pivoting around axes 13, 14, 15, 16 when the tyre 2 is not in contact with the surface 4. The measuring construction 1 is pivotally connected to the vehicle 3 at an axis 13 around which two legs 10, 12 pivot. The actuators 6, 7 act upon the parallelogram 12, such that the legs 8, 9, 10, 11 fold along the axes 13, 14, 15, 16 and the tyre 2 is made to change its pressure on said surface 4 and/or its angle with respect to said surface 4. During this pressure and/or angle change, the measuring construction 1 generally keeps the same height with respect to the road and the vehicle 3.

Figure 2:
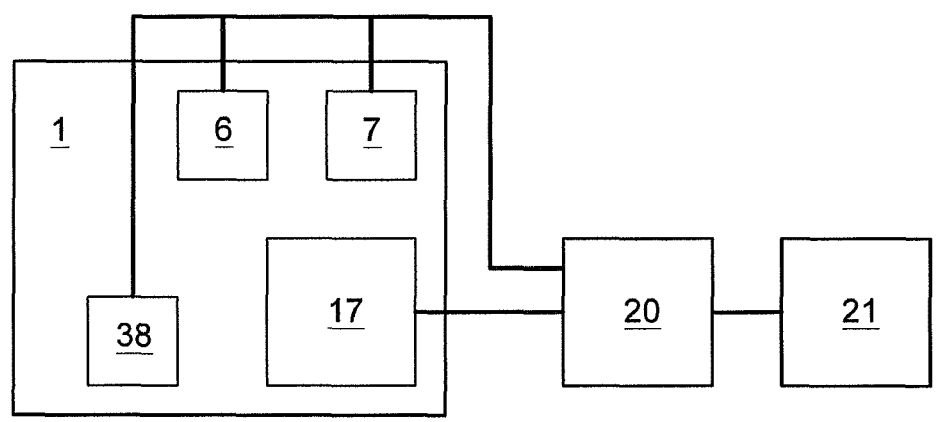
FIG. 2 shows a flow chart of a method using a measuring construction.

A measuring instrument 17 supports a wheel axle 18 supporting a wheel 19 with said tyre 2 and is connected to one 11 of the legs. Changes in angle and/or pressure will induce reaction forces F and/or moments M in the tyre 2, at least when the tyre 2 is in contact with the surface 4. Measuring instrument 17 will then send signals to a processing circuit 20, as can be seen from FIG. 2. The circuit 20 will convert said signals by means of algorithms, preferably into human readable tyre data, for example comprising calculated forces F and/or moments M on said tyre. The tyre data may be presented on a display of a user interface 21. Through a user interface 21 also the actuators 6, 7 can be actuated. For example the tyre pressure on the surface 4 and/or the tyre angle α can be set with the aid of the user interface 21 and the actuators 6, 7 will be actuated accordingly. Also, the processing circuit 20 may receive signals from certain sensors 38, e.g. position and/or temperature sensors 38, that are included in the measuring construction 1. The information that is received from the sensors 38 is used to calculate e.g. a height of the wheel axle 18 with respect to the surface, and may e.g. be used to adjust said height.

Preferably, the measuring construction 1 doesn't need to be translated in a vertical direction by the lift construction 23 when an angle α of the tyre 2 with respect to an upright position of the tyre v is changed, i.e. the height difference of the measuring construction 1 stays relatively small. This height difference can be kept small, among others because an angle β between the bottom or upper leg 8, 9 and a horizontal h shows just a small variation. This is illustrated by FIGS. 3A-3F. For example, FIG. 3B shows a parallelogram 12 for a tyre 2 in upright position, having an angle $\alpha_B$ and $\beta_B$ of 0°. A parallelogram 12 for a tyre 2 having an inclination $\alpha_D$ with respect to the upright position is shown in FIG. 3D, and a parallelogram 12 for a tyre 2 having an inclination $\alpha_F$ with respect to the upright position that is larger than the inclination an FIG. 3D is indicated in FIG. 3F. As can be seen from these figure, $\beta_D$ en $\beta_F$ show just small variations and the legs 8, 12 may be kept relatively horizontal.

Figure 3C:
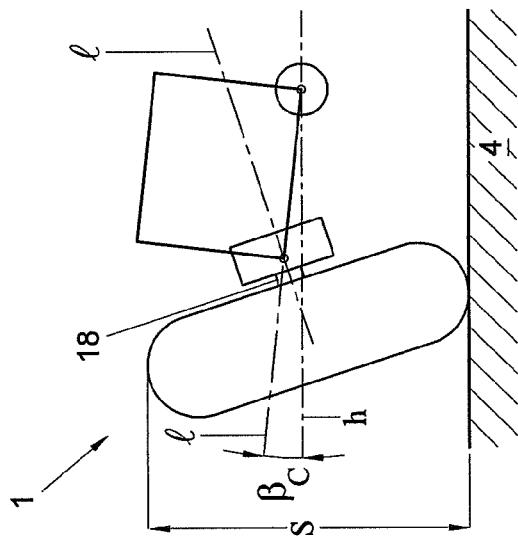
FIGS. 3A-F show schematic side views of a measuring construction with a tyre having different inclinations.
Figure 3B:
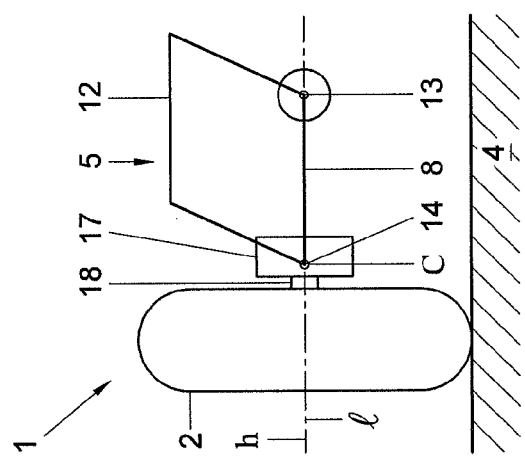
Figure 3A:
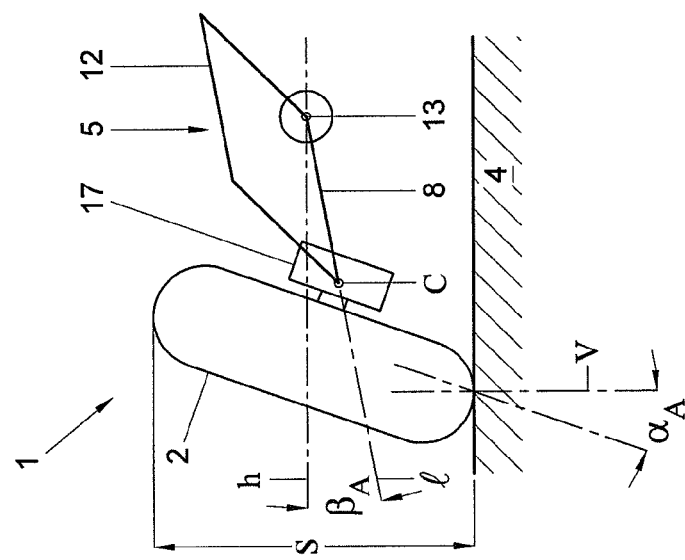
Figure 3F:
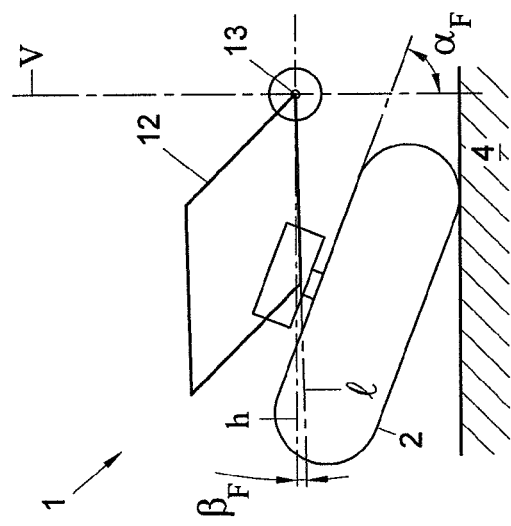
Figure 3E:
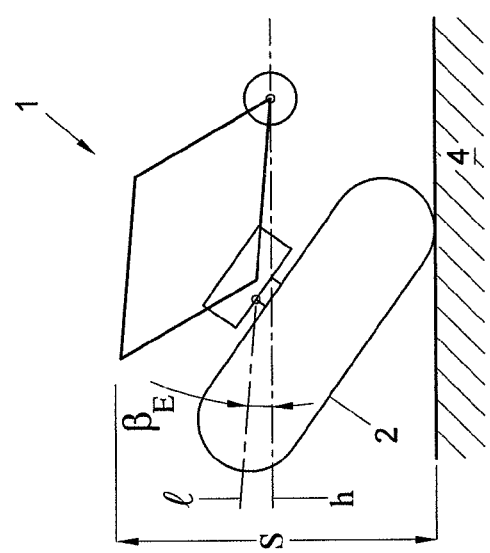
Figure 3D:
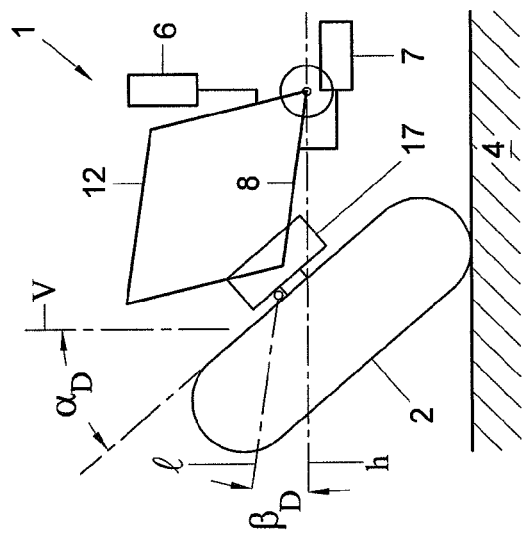
Figure 4:
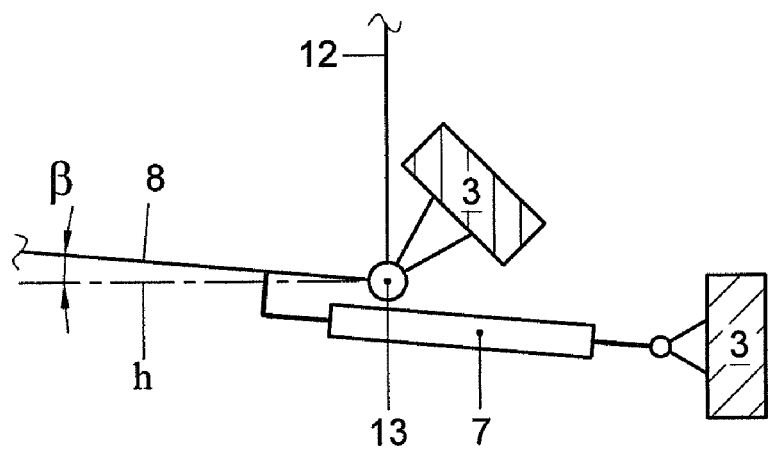
FIG. 4 shows a schematic side view of a part of a measuring construction.

The measuring construction 1 can be connected to the bottom 22 side of a vehicle 3 advantageously, since the construction 1 has minimum variations in height s, as is indicated in FIGS. 3A, 3C and 3E, wherein the height s is the distance between the surface 4 and the top of either the tyre 2 or leg 12, depending on which is higher. Within a maximum height s, the measuring construction 1 can set the tyre 2 at any angle α, within a relatively wide range, e.g. from −20° ($\alpha_A$) to 70° ($\alpha_F$). As an illustration, $\alpha_D$ and $\alpha_F$ may indicate positive angles, for example 35° and 70°, respectively. Since the measuring construction 1 can be mounted under a vehicle 1 relatively easily, a tyre 2 can be conveniently tested and/or measured on an open road, providing for realistic use conditions of the tyre 2.

As can be seen from FIGS. 1 and 3, it is possible to set the tyre 2 at relatively small angles α using the tilt actuator 6 while the bottom leg 8, which is arranged approximately horizontally, is set at relatively small angles β, with respect to the surface 4. Thus it is possible to change the angle α of the tyres 2 by extracting and/or retracting just the tilt actuator 6 with just little or no length variation in the load actuator 7. It is also possible to have the tilt actuator 6 stay in position, such that the tyre 2 angle α stays constant, while the load on the tyre 2 is adjusted by extracting or retracting just the load actuator 7. In other words, the respective loads and/or angles α of the tyre 2 can be controlled substantially independently. These and other features of the measuring construction 1 are advantageous for the testing of motor cycle tyres 2, because motor cycle tyres 2 have the property of applying a constant load on a surface 4 while the angle α of the tyre 2 is changed, for example when taking a curve, whereas four wheeled vehicles generally don't have this property.

In real use, the load characteristics between two motor cycle tyres 2 of one motor cycle are changed when braking or accelerating. For example, when braking the load on the front tyre increases. Such changes can be simulated by applying brakes (which will be explained into more detail here below) and/or applying different loads with the use of load actuator 7, for example. Any adjustment of the actuators 6, 7 may be done automatically by means of processing circuit 20 and/or manually.

In specific embodiments, when the tyre 2 is inclined while a load actuator 7 maintains a constant length, in principle, a load change in the tyre 2 may occur. This may be readily rapidly compensated for by a relatively small displacement of the end e1 of the load actuator 7. For example, when the angle α of the tyre 2 is adjusted while the load actuator 7 is kept relatively constant, the height of the axle 18 is changed. As a consequence, depending on the shape and/or dimensions of the tyre 2, the load on the tyre 2 may change because of a change in pressure that is exerted by the tyre 2 on the surface 4 and the fact that the load actuator 7 stays in position. Therefore the load actuator 7 may compensate for the load change by retracting and/or extracting so that the force on the actuator 7 is the same after the angle α adjustment as before the angle α adjustment. In this way, the load on the tyre 2 can be kept relatively constant.

As can be seen from FIG. 3A-F, an angle β between the bottom leg 8 and a horizontal h is preferably close to 0°. In the examples shown, the angles $β_A$-$β_F$ are for example −10.9°, 0°, 6.1°, 7.8°, 4.0° and −2.1°, respectively. The angle β of the bottom leg 8 may for example vary between −15° and 10°. Within such a small range of angles β, relatively large inclinations α between the tyre 2 and a vertical v can be realized, for example from −20° to 70°, as mentioned above. Said small angles β for said large inclinations α contributes to a separated control of the load F on the tyre 2 and the inclination α of the tyre 2. The small inclination β can be realized, among others, by an optimal dimensioning of the relative dimensions of the parallelogram 12. For example, the relative locations of the axes 13, 14, 15, 16, the distance between the wheel centre and the axis 14, and the lengths of the legs 8, 9, 10, 11 may each or in combination aid in realization of a relatively small inclination β of the bottom leg with respect to the inclination α of the tyre 2.

Furthermore, the centre of the measuring instrument 17 and/or the wheel axle 18 is/are preferably positioned approximately within a longitudinal axis 1 of the bottom leg 8, at least when the inclination β of the leg 8 is close to or exactly 0°, as can be seen from FIG. 3B. This is advantageous for keeping the inclination β close to 0° for a wide range of wheel inclinations α, e.g. from −20° to 70°. For example the wheel axle 18, or a theoretical extension e (see FIG. 3C) of the wheel axle 18, may intersect the axis 14 of the bottom leg 8 and the leg 11 carrying the measuring instrument 17. If the wheel axle 18, or its extension e, doesn't intersect with said axis 14 but is positioned above or below said axis 14 (e.g. see FIG. 1), the inclinations β of the bottom leg 8 for wide ranges of wheel inclinations α become larger, because the end of the bottom leg 8, near said axis 14 will have relatively larger vertical displacements when the wheel inclinations α are changed.

Figure 9:
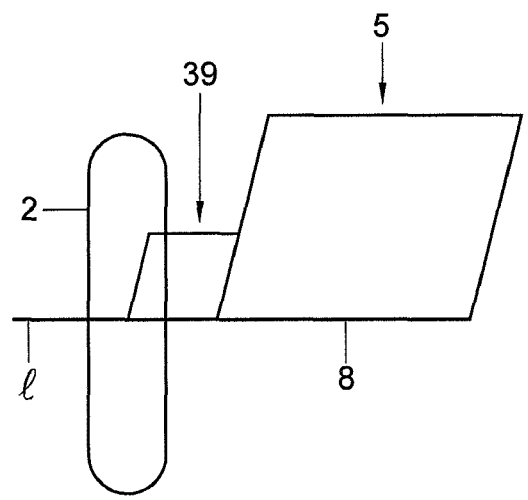
FIG. 9 shows a schematic side view of a measuring construction with a tyre.

In an exemplary embodiment, the tilting arrangement 5 is constructed such that the pivoting axis 14 of a bottom leg 8 and a leg 11 that corresponds to the inclination α of the wheel is arranged in the centre the tyre 2. A non-limiting example for such an embodiment is shown in FIG. 9. Such an embodiment will have an advantageous wheel inclination α to bottom leg inclination β ratio, i.e. will have bottom leg inclinations β close to 0° for a relatively wide range of wheel inclinations α. For this, a separate construction 39, e.g. a foldable construction/parallelogram, could be realized within the centre of the tyre 2.

Figure 6:
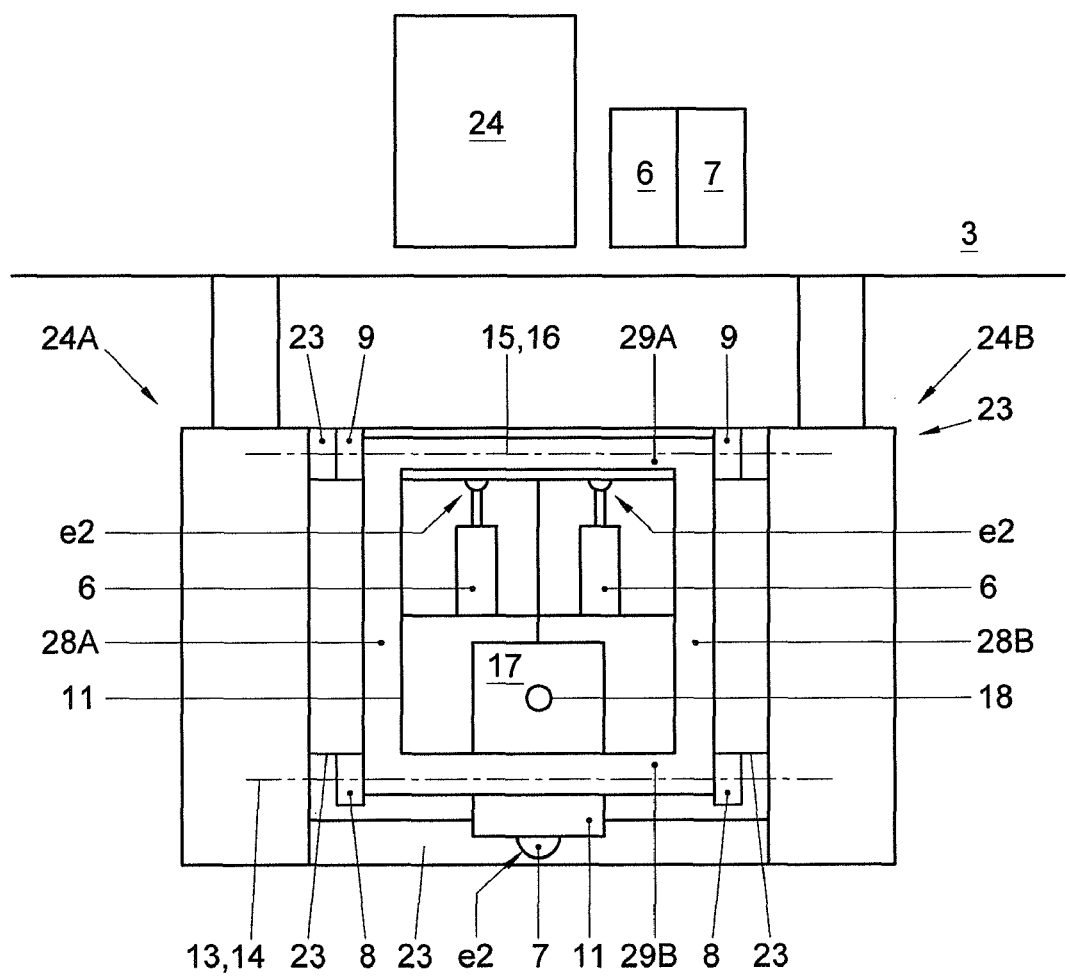
FIG. 6 shows a front view of a measuring construction.

Preferably, the tilting arrangement 5 is connected to the vehicle 3 via a lift construction 23, as is illustrated in FIG. 6. This lift construction 23 lowers the measuring construction 1 such that an angle β between the bottom leg and the horizontal h of approximately 0° is realized while the tyre 2 is on the ground having an inclination α of 0°. The lift construction 23 is also used to lift the measuring construction 1 from the ground for example with the use of a pneumatic cylinder 24. Furthermore pneumatic means 24A and 24B may be used to lower the measuring construction 1 and to compensate for holes or bumps in the surface 4. When someone is connecting the tyre 2 to the measuring construction 1, the measuring construction 1 is in a lifted condition such that the tyre 2 can be connected to the axle 18 relatively easily. Before and after measuring and testing, the lift construction 23 is used for adjusting the height. As can be seen from FIG. 6, the tilting arrangement 5 is connected to the lift construction 23 at axis 13 and the ends e2 of the actuators 6, 7 are connected to the lift construction 23.

Furthermore, the measuring construction 1 may be arranged to the support construction 3, e.g. the lift construction 23, such that the measuring construction 1, i.e. the tyre 2, may be rotated around a vertical axis, for between −18° to 18°. This is for example advantageous for taking curves. For example, the lifting construction 23 and/or measuring construction 1 may be mounted on a platform that can be rotated.

The lift construction 23 may comprise shock absorption means, for example the pneumatics 24 are provided with means for pressure compensation. Such shock absorption may especially be advantageous when the surface 4 for example comprises holes, stones, bumps, etc.

Figure 5:
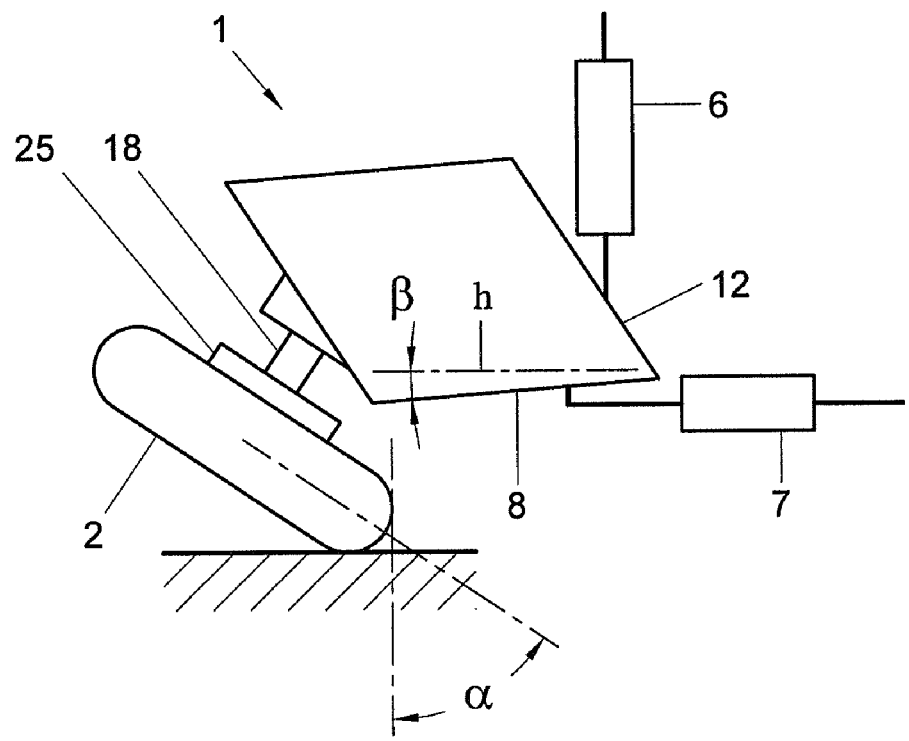
FIG. 5 shows a schematic side view of a measuring construction with tyre.

In an embodiment, the measuring construction 1 is provided with a brake system 25, as indicated in FIG. 5. This brake system 25 may be supported by the measuring instrument 17 such that when braking, the load and moment changes in the tyre 2 pass through the measuring instrument 17 and don't "leak" away by connection of the brake system 25 to other parts such as the tilting arrangement 6. Obviously, the brake system 25 may also be supported by the wheel axle 18, at least partly, since the axle 18 is also supported by the measuring instrument 17. By connecting the brake system 25 directly or indirectly to the measuring instrument 17, the tyre 2 can be braked without disturbing the forces and/or moments to be measured. The force and moment changes in the tyre 2 can be measured in a controlled way while the applied load and/or angle α to the tyre 2 are also controlled. For example, the tyre 2 may be braked while it is being inclined.

The measuring instrument 17 may comprise load, tension and/or moment sensors 26 and/or combination thereof for being able to measuring forces and/or moments on the instrument 17 in three mutually perpendicular directions. For these types of sensors, piezoelectric techniques are commonly used although other techniques may also be suitable. In an embodiment, the measuring instrument 17 is block shaped and comprises cylinder shaped sensors 26 near each corner, as can be seen from FIG. 7. The measuring instrument 17 may comprise bearings for supporting the wheel axle 18. The loads F and moments M on the tyre 2 are transmitted by the measuring instrument 17 via the axle 18. The measuring instrument 17 is supported by the front leg 11 that comprises an opening 27 in a spacer 29 wherein the instrument 17 may be fitted.

Figure 7:
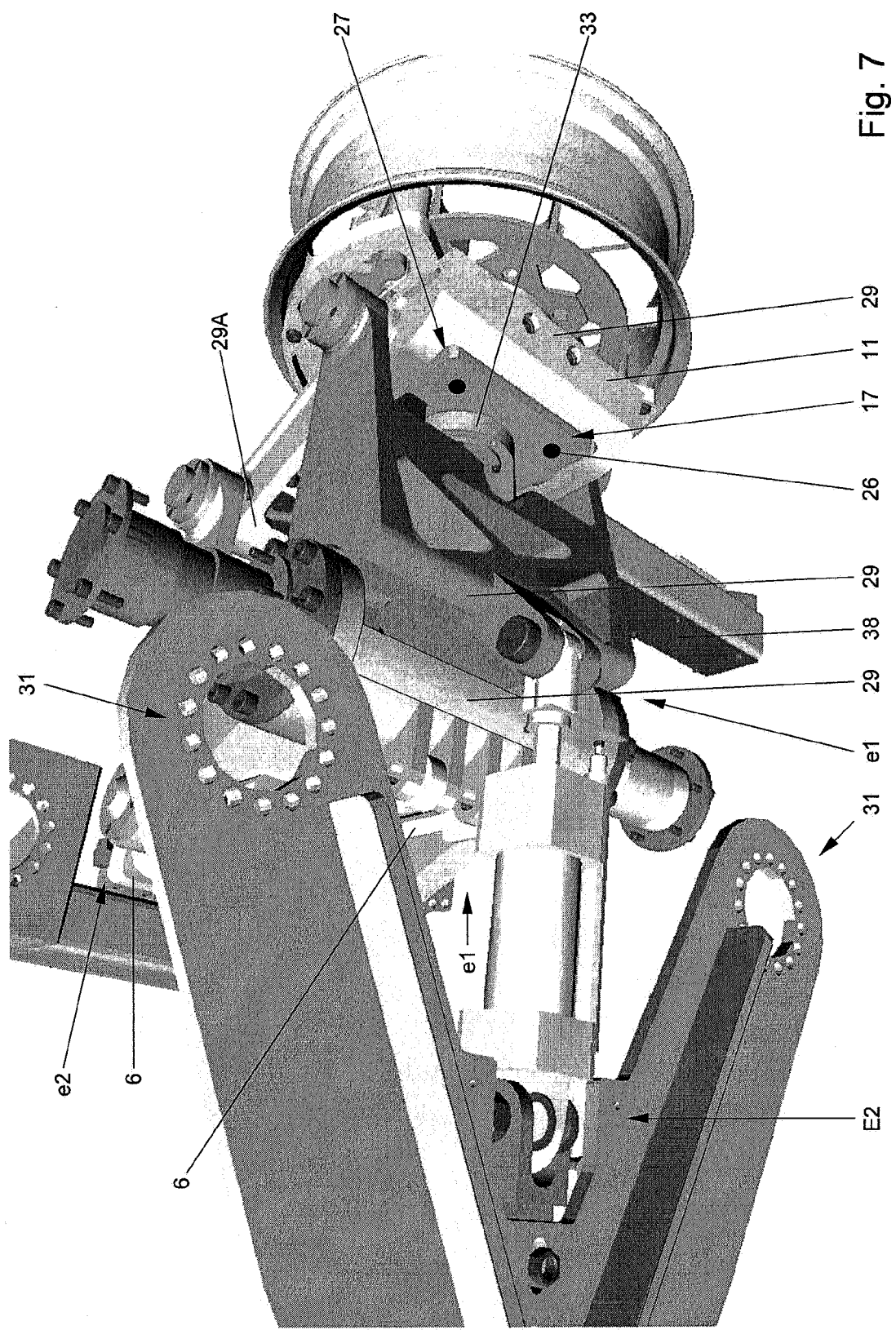
FIG. 7 shows a perspective view of a measuring construction.

An embodiment is shown in FIGS. 6 and 7. The embodiment comprises a parallelogram 12, wherein each leg 8, 9, 10, 11 comprises parallel legs 28A, 28B, that may be connected by the axes 13, 14, 15, 16 and/or bars 29A and/or 29B at the ends. By applying parallel legs 28A, 28B connected to the axes 13, 14, 15, 16 the parallelogram 12 can efficiently withstand forces in the parallelogram that occur as a result of braking and/or accelerating, for example. The spacers 29 may keep the space between each leg 8, 9, 10, 11 constant. At least one of the spacers 29 serves as a housing for the measuring instrument 17, such that it is conveniently embedded in a leg 11. Also the spacers 29 are configured such that the actuators 6,7 are allowed to pass through and have moving space, while the actuators may be pivotally connected to the legs 8, 10 by means of said spacers 29.

Figure 8:
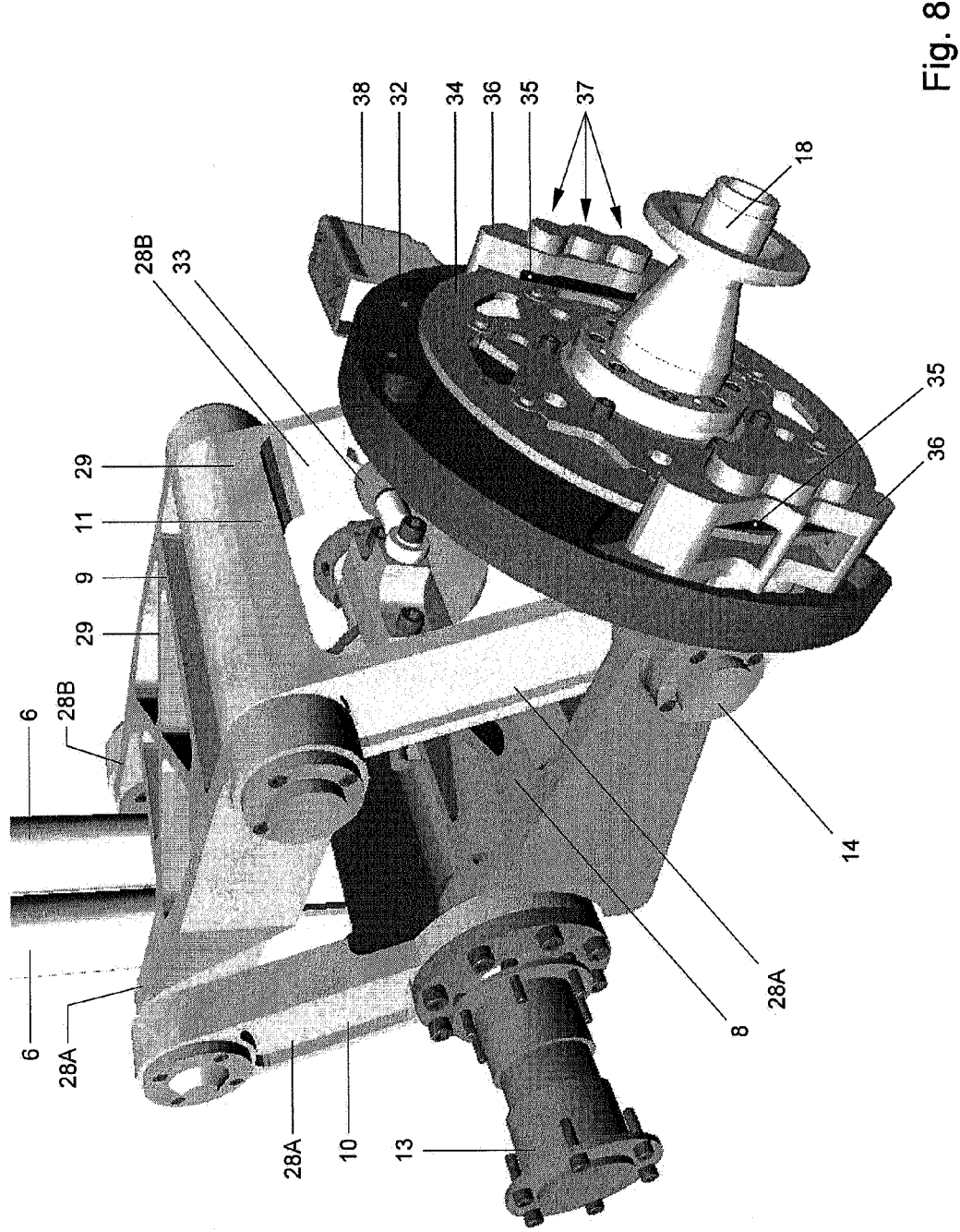
FIG. 8 shows a perspective view of a measuring construction.

As can be seen from FIG. 8, the tilt actuators 6 pass between two legs 28A, 28B of the upper leg 9. The upper leg 9 spacer 29 is configured such that it can move in the direction of the rear leg 10 and the direction of the front leg 11, without being obstructed by the tilt actuators 6. The tilt actuators 6 are pivotally connected to the rear leg 10 at the ends e1 via the rear leg 10 spacer 29. At the ends e2 the tilt actuators may be pivotally connected to the lift construction 23. The rear leg 10 and the bottom leg 8 pivot around the axis 13 that is supported by the lift construction 23. For example, when the tilt actuators 6 retract, the upper leg 9 is moved in the direction of the front leg 11 and parallel to the bottom leg 8, such that the front leg 11 is inclined to the front, parallel to the rear leg 10. For example, the angle α of the tyre 2 may be widened by retracting the tilt actuators 6.

The load actuator 7 is pivotally connected to the lift construction 23 at its end e2, for example by means of arms 30 that are connected to the lift construction 23 via ends 31. At the other end e1, the load actuator 7 is pivotally connected to the bottom leg 8 spacer 29. As can be seen, the load actuator 7 is positioned horizontally. Extracting and retracting the load actuator 7 may change the angle β between the bottom leg 8 and a horizontal h (FIG. 5) such that the load on the tyre 2 is changed. A relatively small inclining movement of the bottom leg 8 is enough to induce relatively large load changes in the tyre 2. Thus the changes in length of the load actuator 7 can be kept to a minimum, whereas the changes in length of the tilt actuators 6 for inclining the tyre 2 may be relatively larger.

The brake system 25 comprises an anchor plate 32 that is rotationally supported on the axle 18, for example by bearings. In position, the anchor plate 32 is fixed to an arm 33, which is fixed to the measuring instrument 17, particularly to the back of the measuring instrument 17. Since it is fixed the anchor plate 32 doesn't rotate with the axle 18. A brake disc 34 is fixed to axle 18 such that they rotate together. Brake shoes 35 are provided in brake shoe holders 36, actuated by brake actuators 37. The brake shoe holders 36 are fixedly connected to the anchor plate 32. When actuated the brake shoes 35 are pressed against the brake disc 34 by the brake actuators 37 and such that the rotational speed of the axle 18 is decreased. The braking torque thus exerted is transmitted by the anchor plate 32, via the arm 33, to the measuring instrument 17. The brake system 25 is fully supported by the measuring instrument 17, such that changes in moments and forces that occur due to braking pass through the measuring instrument 17.

The measuring construction 1 may comprise position sensors 38 for measuring the position of the measuring construction 1 with respect to the surface 4. In an embodiment, the position sensor 38 comprises a laser system, for example connected to the bottom leg 8, which is kept in a relatively constant position, wherein the laser system and/or the processing circuit 20 are for example configured to measure the distance between the measuring construction 1 or at least parts of the measuring construction 1, such as for example the axle 18 and/or the tyre 2, and the surface 4.

The measuring construction 1 can be advantageous for testing motor cycle tyres 2. Although it is suitable for testing a tyre 2 of any type of vehicle, in general it is suitable for vehicles having one or more, mostly two, wheels that lie substantially in the same plane when the wheels are aimed in a straight forward direction. Such vehicle may for example be a motorcycle, scooter, moped, bicycle, monocycle, footbike, autoped, three wheeled tandem or the like. In these vehicles, in general the vertical force vector that acts on the tyres stays constant when the tyres are inclined, for example when taking curves. Such vehicles could maybe be described as non-self balanced vehicles. The invention is especially suitable for tyres 2 for these kind of vehicles.

In principle, next to tyres, any type of rolling surface may be suitable for the invention, as long as a part of the rolling surface is in contact with the ground for moving said vehicle along said ground. In particular cases, the invention may for example include wheels without tyres. For example, non-inflatable wheels are known, which are also suitable for the invention. Those types are configured in a way as to substitute inflated tyres, for example, and may be constructed from a special type of material, for example, but not limited, from special compounds and/or rubbers or the like. Here, discussion might arise, whether these types of wheels should also be regarded as tyres. Obviously, the use of such tyres or wheels should also be considered included within the scope of the invention.

Instead of a relatively heavy weight vehicle 3 such as a truck or trailer, the measuring construction 1 may be supported by any support arrangement such as for example other vehicles such as vans, cars, etc. or to support arrangements like for example robots, walls, floors, ceilings, frames or the like, for testing on either stationary or rolling surfaces 4. In any of these embodiments, the support arrangement 3 may have incorporated a lift construction 23 for vertical displacement of the measuring construction 1, for example such as the one mentioned in the description.

As mentioned, the tyre 2 is tested on a surface 4. Such surfaces 4 may for example include asphalt, rocky bottom, endless conveyor belts (e.g. "flat tracks", drums), concrete, any type of natural and/or man made ground, any type of road and/or indoor or outdoor testing ground, etc.

Within the scope of the invention, different actuators 6, 7 can be applied. For example, in an embodiment, hydraulic cylinders are applied. In other embodiments, the actuators 6, 7 may comprise pneumatics, motors, transmission elements, etc. The type and construction of such actuators 6, 7 can depend on the type and size of the tyre to be tested.

It shall be obvious that the invention is not limited in any way to the embodiments that are represented in the description and the drawings. Many variations and combinations are possible within the framework of the invention as outlined by the claims. Combinations of one or more aspects of the embodiments or combinations of different embodiments are possible within the framework of the invention. All comparable variations are understood to fall within the framework of the invention as outlined by the claims.

The invention claimed is:

1. Measuring construction for measuring use conditions of a tyre, configured to be mounted to a support arrangement and provided with a tilting arrangement for tilting and/or adjusting a force on a tyre, wherein the tilting arrangement is provided with
   a measuring instrument that is connected to the tilting arrangement, at least configured to measure forces and/or moments on a tyre,
   a wheel axle supported by the measuring instrument,
   and at least one actuator for driving the tilting arrangement,
   wherein the tilting arrangement comprises a foldable construction for tilting, lifting and/or lowering a tyre, connected to the at least one actuator.

2. Measuring construction according to claim 1, wherein the foldable construction comprises at least one first and at least one second leg that are pivotally connected, wherein at least a first leg is pivotally connected to the support arrangement and a second leg supports the measuring instrument.

3. Measuring construction according to claim 1, wherein the foldable construction comprises a parallelogram having at least two mutually parallel first legs and at least two mutually parallel second legs.

4. Measuring construction according to claim 2, wherein the centre of the measuring instrument is approximately arranged at a longitudinal axis of a first leg, to transmit forces and/or moments between the tyre and the tilting arrangement.

5. Measuring construction according to claim 1 comprising a brake system that is mainly supported by the measuring instrument.

6. Measuring construction according to claim 1, wherein at least one load actuator is connected to at least one first leg.

7. Measuring construction according to claim 1, wherein at least one load actuator is pivotally connected to at least one first leg at one end and to the support arrangement at the other.

8. Measuring construction according to claim 1, wherein at least one tilting actuator is connected to at least one second leg for tilting the second leg.

9. Measuring construction according to claim 1, wherein at least one tilting actuator is pivotally connected to at least one second leg at one end and to the support arrangement at the other.

10. Measuring construction according to claim 1, wherein the at least one actuators comprises a hydraulic and/or pneumatic cylinder.

11. Measuring construction according to claim 1, wherein the measuring construction is provided with at least one positioning sensor arranged to measure at least the position of at least a part of the measuring construction with respect to a surface.

12. Measuring construction according to claim 1 provided with a processing circuit connected and/or connectable to the measuring instrument and configured to convert signals received from the measuring instrument into tyre data.

13. Measuring construction according to claim 1 provided with a support arrangement, wherein the support arrangement is a movable vehicle, preferably a relatively heavy weight vehicle such as a truck or trailer.

14. Measuring construction according to claim 1, wherein the support arrangement comprises a lift construction for moving the tilting arrangement up and down with respect to the support arrangement.

15. Measuring construction according to claim 13, wherein the measuring construction is configured to be pivotally connected to the support arrangement at a pivoting axis of a first and second leg.

16. Measuring construction according to claim 1, wherein the measuring instrument supports an axle with a wheel with a tyre, wherein the tyre represents a tyre configured to be mounted on a vehicle having at least two wheels, the wheels of which lie substantially in the same plane when the wheels are aimed in a straight forward direction, such as a motorcycle, scooter, moped, bicycle, monocycle (being an exception with one wheel), footbike, autoped or the like.

17. Method for automatically measuring tyre data comprising the steps of:
    rotating a tyre around a wheel axle such that said tyre is moved along a surface;
    measuring at least reaction forces and/or moments that occur on said tyre and converting said measurements to tyre data, wherein said tyre data includes a first variable and a second variable, said first variable being i an applied force vector and said second variable being an inclination of the tyre with respect to the surface; and
    varying said first or second variable while the other variable is kept relatively constant.

18. Method according to claim 17, wherein said first variable comprises a substantially vertical force vector.

19. Method according to claim 17, wherein during braking of the tyre at least one applied force vector is actively varied.

20. Method according to claim 17 comprising the use of a parallelogram for varying said force vector and/or inclination.

21. Method according to claim 17, wherein said tyre is rolled along a surface, preferably an outdoor surface, by moving a vehicle, such as a truck or trailer.

22. Use of a measuring construction for measuring use conditions of a tyre, configured to be mounted to a support arrangement and provided with a tilting arrangement for tilting and/or adjusting a force on a tyre, wherein the tilting arrangement is provided with
    a measuring instrument that is connected to the tilting arrangement, at least configured to measure forces and/or moments on a tyre,
    a wheel axle supported by the measuring instrument, and at least one actuator for driving the tilting arrangement,
    wherein the tilting arrangement comprises a foldable construction for tilting, lifting and/or lowering a tyre, connected to the at least one actuator in a method according to claim 17.

23. Method for producing a tyre, wherein tyre data that is obtained by a method according to claim 17 is used to determine the tyre dimensions and/or composition for the production of the tyre.

* * * * *